United States Patent
Oomori et al.

(10) Patent No.: US 6,174,832 B1
(45) Date of Patent: Jan. 16, 2001

(54) CERAMIC COMPOUNDS UNDERGOING MARTENSITIC TRANSFORMATION AND METHODS FOR PRODUCING THEM, AND HIGHLY-TOUGH COMPOSITE MATERIALS

(75) Inventors: Mamoru Oomori; Toshio Harai, both of Sendai (JP)

(73) Assignees: Mamoru Omori; Seiko Instruments Inc.

( * ) Notice: Under 35 U.S.C. 154(b), the term of this patent shall be extended for 0 days.

(21) Appl. No.: 09/162,255

(22) Filed: Sep. 28, 1998

(30) Foreign Application Priority Data

Sep. 30, 1997 (JP) .................................... 9-266002

(51) Int. Cl.[7] ........................ C04B 35/50; C04B 35/115; C04B 35/10
(52) U.S. Cl. ........................ 501/152; 501/153; 501/154; 501/127; 501/134; 501/96.1; 501/96.3; 501/76.3; 501/97.1; 501/98.9; 501/120; 501/123; 501/32; 501/126

(58) Field of Search ..................................... 501/152, 153, 501/127, 154, 134, 76.1, 97.1, 98.9, 120, 123, 1, 32, 126

(56) References Cited

U.S. PATENT DOCUMENTS 5,384,293 * 1/1995 Omori et al. ........................ 501/152
5,439,853    8/1995 Omori et al. .......................... 501/89

* cited by examiner

Primary Examiner—C. Melissa Koslow
(74) Attorney, Agent, or Firm—Adams & Wilks

(57) ABSTRACT

A ceramic compound which undergoes martensitic transformation comprises a compound represented by compositional formula $Ln_{1-x}Si_xAlO_{3+0.5x}$ obtained by substituting a part of $LnO_{1.5}$ in $LnAlO_3$-type compounds with $SiO_2$, where Ln represents at least one element selected from the group consisting of Sc, Y, La, Ce, Pr, Nd, Pm, Sm, Eu, Gd, Tb, Dy, Ho, Er, Tm and Yb, and x=0.01 to 0.3.

9 Claims, 2 Drawing Sheets

CERAMIC COMPOUNDS UNDERGOING MARTENSITIC TRANSFORMATION AND METHODS FOR PRODUCING THEM, AND HIGHLY-TOUGH COMPOSITE MATERIALS

BACKGROUND OF THE INVENTION

1. Field of the Invention

The present invention relates to ceramic compounds which undergo martensitic transformation and methods for producing them, and also to highly-tough composite materials consisting essentially of the compounds. In particular, the invention is to propose ceramic compounds capable of exhibiting high toughness through the phenomenon that follows their thermo-elastic martensitic transformation, and inorganic composite materials.

The ceramic compounds and the composite materials of the invention are effectively used in broad fields of artificial bones, artificial teeth, engine parts, gas turbine blades, parts for gas turbines, parts of corrosion-resistant devices, crucibles, parts for ball mills, electric insulating materials, tools, heat-insulating materials, substrates for electronic circuits, sealants, joints, parts for valves, pumps, nozzles, roller guides, ferrules, bearings, etc.

2. Description of the Related Art

As compared with metals and polymer materials, in general, ceramics have higher hardness, better heat resistance and better corrosion resistance and are characterized by their good electric and magnetic properties.

On the other hand, however, the toughness of ceramics is much inferior to that of metals and polymers, and therefore, ceramics are defective in that their use is limited.

In order to overcome the drawback (low toughness) of ceramics, various proposals have heretofore been made. Of those, one technique for increasing the toughness of ceramics which is based on the martensitic transformation of ceramic materials is most widely noticed, since the method for producing the toughened ceramics according to the technique is easy and the technique itself is greatly effective. For example, known is highly-tough zirconia, for which the technique is based on the non-reversible stress-inducing phase transformation mechanism for non-thermo-elastic martensitic transformation. Specifically, according to the technique, tetragonal crystals of zirconia in a high-temperature mother phase are stabilized at a temperature not higher than room temperature, at which the crystals may be cracked, while being subjected to phase transformation into martensitic monoclinic crystals, whereby the crystals are prevented from being more cracked owing to the volume expansion that results from the phase transformation.

However, as being based on the non-reversible stress-inducing phase transformation, the conventional highly-tough ceramics that undergo martensitic transformation are still problematic in that the toughness in the area around the cracks having been formed during the phase transformation into monoclinic crystals is rather lowered. In addition, if they are much damaged continuously for a long period of time, their toughness is gradually lowered as a whole, resulting in that they could no more have high toughness.

As so mentioned hereinabove, the conventional highly-tough ceramics are based on the phase transformation from the high-temperature phase of tetragonal crystals into the stable martensite phase via the semi-stable phase that is even at temperatures not higher than room temperature. However, the phase transformation of that type will occur even when ceramic compounds react with water, and is especially activated at temperatures falling between 200 and 300° C. Therefore, the conventional highly-tough ceramics are further problematic in that they are unstable.

Moreover, at present, alumina is principally combined with the conventional highly-tough zirconia to produce highly-tough composite ceramic materials, since the combination has been proved effective. Therefore, there is still another problem in that the conventional highly-tough zirconia could not be combined with any other ceramics except alumina to produce highly-tough composite ceramic materials.

SUMMARY OF THE INVENTION

One essential object of the invention is to obtain ceramic compounds having not only high hardness and strength but also high toughness.

Another object of the invention is to obtain ceramic compounds that are stable even at temperatures not higher than room temperature.

Still another object of the invention is to provide ceramic materials capable of being combined with any and every type of ceramics to give highly-tough composite ceramic materials.

Still another object of the invention is to propose a technique for easily producing highly-tough ceramic compounds that undergo thermo-elastic martensitic transformation.

Still another object of the invention is to provide inorganic composite materials having high strength and toughness and suitable for construction materials.

In order to realize the above-mentioned objects, we, the present inventors have assiduously studied and, as a result, have developed novel ceramic compounds which undergo martensitic transformation.

Specifically, the invention provides ceramic compounds which undergo martensitic transformation and which are represented by a rational formula, $Ln_{1-x}Si_xAlO_{3+0.5x}$, where Ln represents at least one selected from Sc, Y, La, Ce, Pr, Nd, Pm, Sm, Eu, Gd, Tb, Dy, Ho, Er, Tm and Yb, and x=0.01 to 0.3.

In the invention, preferably, the compounds of formula $Ln_{1-x}Si_xAlO_{3+0.5x}$, in which Ln represents at least one selected from Sc, Y, La, Ce, Pr, Nd, Pm, Sm, Eu, Gd, Tb, Dy, Ho, Er, Tm and Yb, and x=0.01 to 0.3, are obtained by substituting a part of $LnO_{1.5}$ in $LnAlO_3$-type compounds with $SiO_2$.

The invention also provides a method for producing ceramic compounds which undergo martensitic transformation, the method comprising mixing $Ln_2O_3$, $SiO_2$ and $Al_2O_3$ in a ratio of from 0.99 to 0.7 mols of $Ln_2O_3$, from 0.02 to 0.6 mols of $SiO_2$ and 1 mol of $Al_2O_3$, followed by reacting the thus-mixed compounds in an oxidizing or non-oxidizing atmosphere at a temperature falling between 1200 and 1600° C. for 0.1 to 3 hours to produce $Ln_{1-x}Si_xAlO_{3+0.5x}$, where Ln represents at least one selected from Sc, Y, La, Ce, Pr, Nd, Pm, Sm, Eu, Gd, Tb, Dy, Ho, Er, Tm and Yb, and x=0.01 to 0.3.

Preferably, the production method comprises reacting an $LnAlO_3$-type compound, in which Ln represents at least one selected from Sc, Y, La, Ce, Pr, Nd, Pm, Sm, Eu, Gd, Tb, Dy, Ho, Er, Tm and Yb, in an oxidizing or non-oxidizing atmosphere at a temperature falling between 1200 and 1600° C. for 0.1 to 3 hours, thereby substituting a part of $LnO_{1.5}$ in said compound with $SiO_2$ to give a substituted product of $Ln_{1-x}Si_xAlO_{3+0.5x}$, in which x=0.01 to 0.3.

Also preferably, the production method comprises putting a starting mixture composed of from 0.99 to 0.7 mols of $Ln_2O_3$, from 0.02 to 0.6 mols of $SiO_2$ and 1 mol of $Al_2O_3$, or an $LnAlO_3$-type compound into a graphite mold, followed by processing it with discharge plasma in vacuum or in an inert gas at a temperature falling between 1200 and 1600° C. for 0.01 to 0.5 hours to obtain a substituted product of $Ln_{1-x}Si_xAlO_{3+0.5x}$, in which x=0.01 to 0.3.

The invention further provides a highly-tough composite material, which comprises a burned composite product of a mixture composed of the ceramic compound noted above and at least one selected from $Al_2O_3$, wollastonite, spodumene, spinel, mullite, glass, silica glass, hydroxyapatite, $ABO_3$ complex oxide, germanate, phosphate, titanate, nitride, carbide, boride and silicate.

DETAILED DESCRIPTION OF THE PREFERED EMBODIMENTS

Figure 1:
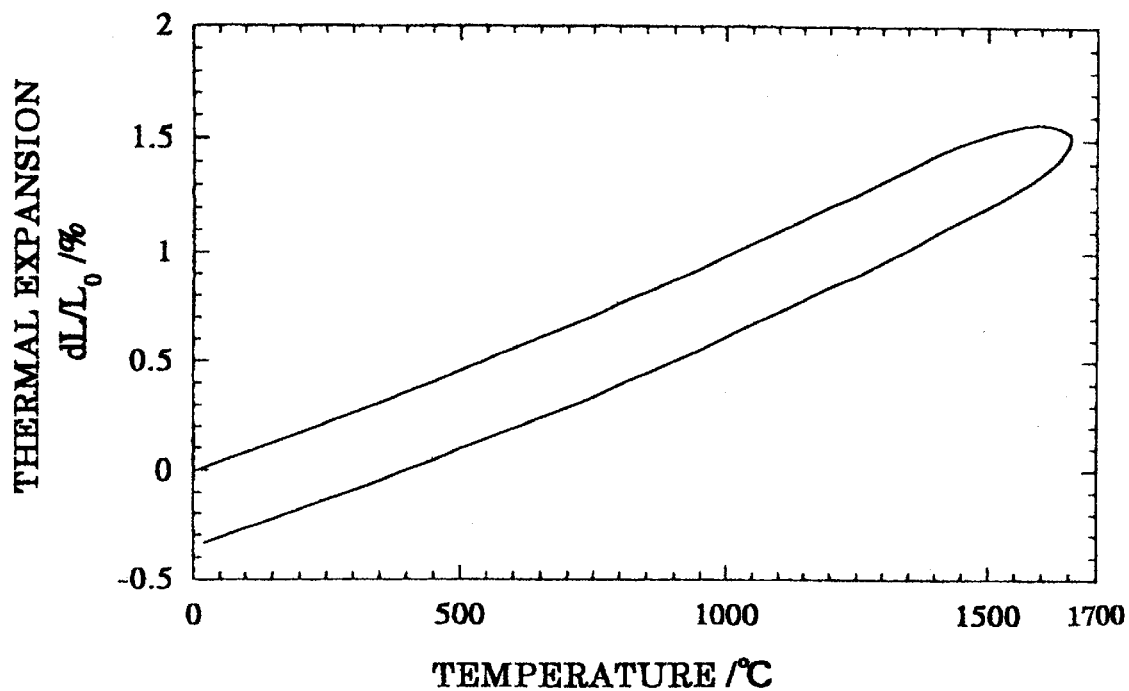
FIG. 1 is a graph of the thermal expansion curve of $NdAlO_3$.

In general, shape-memory alloys are substances that undergo thermo-elastic martensitic transformation. Pseudo-elastic effects are expected for the thermo-elastic martensitic transformation. It is known that the pseudo-elasticity includes two phenomena of superelasticity and rubber-like elasticity. The superelasticity is a phenomenon that is based on stress-inducing phase transformation, in which stress induces martensitic transformation and the thus-transformed martensite phase is restored to the mother phase after removal of the stress. Based on this phenomenon, shape-memory alloys can be deformed to a higher degree than ordinary metals.

On the other hand, the rubber-like elasticity is a phenomenon in which stress applied to twin crystals having been transformed to be in a martensite phase at a temperature not higher than the martensitic transformation point induces deformation of the twin crystals at their interfaces and the thus-deformed twin crystals are restored to its original condition after removal of the stress. In principle, ceramics could be highly toughened due to those two phenomena.

In view of the knowledge, the production, if possible, of compounds that undergo thermo-elastic martensitic transformation would bring about the production of ceramic compounds and even composite materials (ceramics) which are highly tough at temperatures near to or below the martensitic transformation point of the compounds.

Given that situation, we, the present inventors first studied various prior art techniques for many oxides in order to develop novel compounds that could undergo martensitic transformation and have pseudo-elastic effects. As a result, we have known that $LnAlO_3$-type compounds undergo some phase transformation [S. Celler and P. M. Raccah, Phys. Rev. B, 2(4), 1167–1172 (1970)].

However, we could not know from the disclosure of this literature as to whether or not $LnAlO_3$-type compounds would undergo martensitic transformation. In particular, nothing is reported in the literature relating to the toughness of $LnAlO_3$-type compounds themselves, and there is found no other report therein that refers to the improvement in the toughness of composite materials comprising $LnAlO_3$-type compounds and other ceramics.

Having presumed that the phase transformation seen in the conventional $LnAlO_3$-type compounds would be martensitic transformation, in that situation, we, the inventors began to study what means we could take for increasing the toughness of the compounds. In the process of our studies, we considered that the poor toughness of the $LnAlO_3$-type compounds would result from the phase transformation thereof to bring about poor pseudo-elastic effects. In that situation, we have further studied what other means we could take for increasing the pseudo-elastic effects of those $LnAlO_3$-type compounds, and, as a result, have reached the conclusion that substituting a part of $LnO_{1.5}$ in $LnAlO_3$ with $SiO_2$ is effective for our object.

Accordingly, we, the inventors have newly produced $SiO_2$-substituted compounds to be represented by a rational formula of $Ln_{1-x}Si_xAlO_{3+0.5x}$, in which x=0.01 to 0.3, and analyzed the structure of those compounds through X-ray diffractometry. In particular, we measured the thermal expansion of the substituted compounds, and analyzed the influence, if any, of the partial substitution of $LnO_{1.5}$ with $SiO_2$ on the phase transformation of the compounds. As a result, we have confirmed that the substituted compounds are greatly effective for toughening ceramics.

Our studies have revealed that, in the compounds to be represented by the rational formula of $Ln_{1-x}Si_xAlO_{3+0.5x}$, x must be defined to fall between 0.01 and 0.3. The reason is because, if x is smaller than 0.01, the compounds are no more effective for toughening ceramics. However, if x is larger than 0.3, the amount of the impurities to be in the compounds shall be too large, relative to the effective amount of substitution. In addition, the substitutable amount of $SiO_2$ is limited, and the presence of such too much impurities does not produce single-phase compounds.

In the rational formula, Ln represents at least one rare earth element selected from Sc, Y, La, Ce, Pr, Nd, Pm, Sm, Eu, Gd, Tb, Dy, Ho, Er, Tm and Yb.

We made other experiments to confirm as to whether or not the ceramic compounds having the structure of the rational formula noted above undergo martensitic transformation. In the experiments, we employed compounds of $Nd_{1-x}Si_xAlO_{3+0.5x}$. Of those compounds, the thermal expansion curves (for volume change) of the non-substituted one where x=0 and the substituted ones where x=0.05, x=0.1 and x=0.2 are shown in FIG. 1 to FIG. 4.

In FIG. 1 for $NdAlO_3$, seen is an inflection point at a temperature of 1590° C. in the heating process, at which the compound having thermally expanded changes to shrink. In the cooling process, however, the compound shrinks continuously, and no inflection point is seen.

Figure 2:
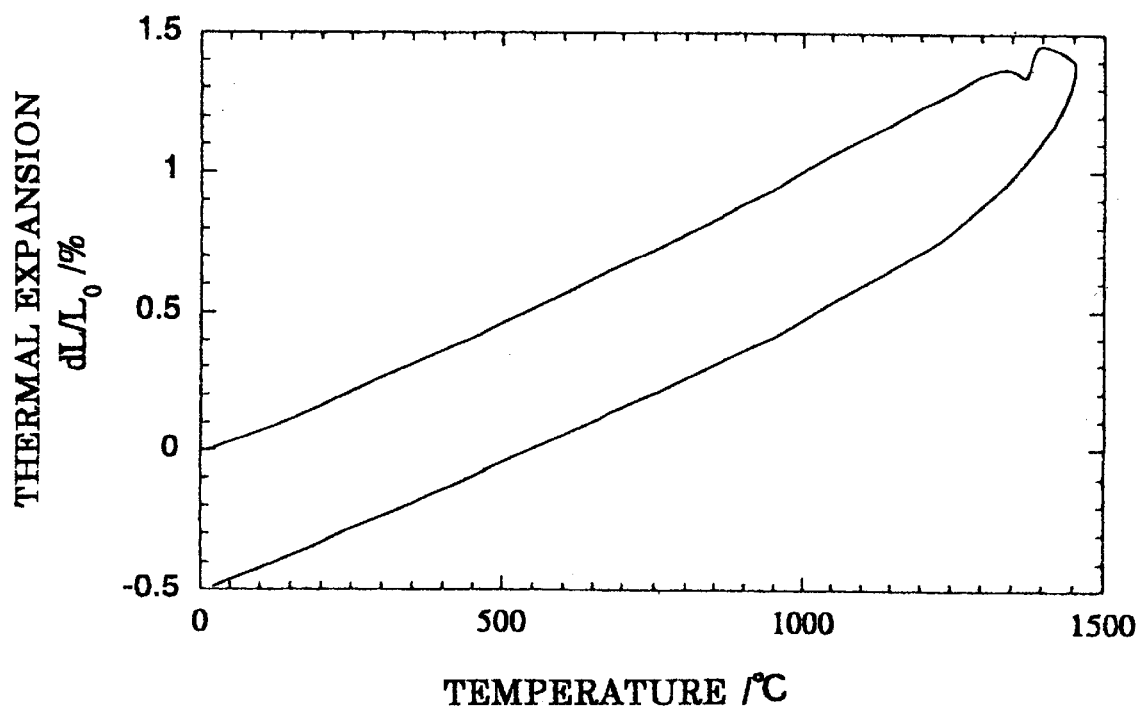
FIG. 2 is a graph of the thermal expansion curve of $Nd_{0.95}Si_{0.05}AlO_{3.025}$.

FIG. 2 shows the thermal expansion profile of a substituted compound, $Nd_{0.95}SiO_{0.05}AlO_{3.025}$ (x=0.05). As shown therein, the compound has changed in the heating process in such a manner that it once begins to shrink at 1340° C., then greatly expands at 1370° C., and again begins to shrink at 1400° C. In the cooling process, however, the compound has only shrunk continuously. It is believed that such a complicated change in the volume of the compound in the heating process will be because of the martensitic transformation of the compound.

Summarizing the experimental data noted above, it is known that the volume change not definite in the compound $NdAlO_3$ is definite in the $SiO_2$-substituted compound, and the possibility has been confirmed that the pseudo-elastic effects resulting from the martensitic transformation of the $SiO_2$-substituted compound will be augmented.

Figure 3:
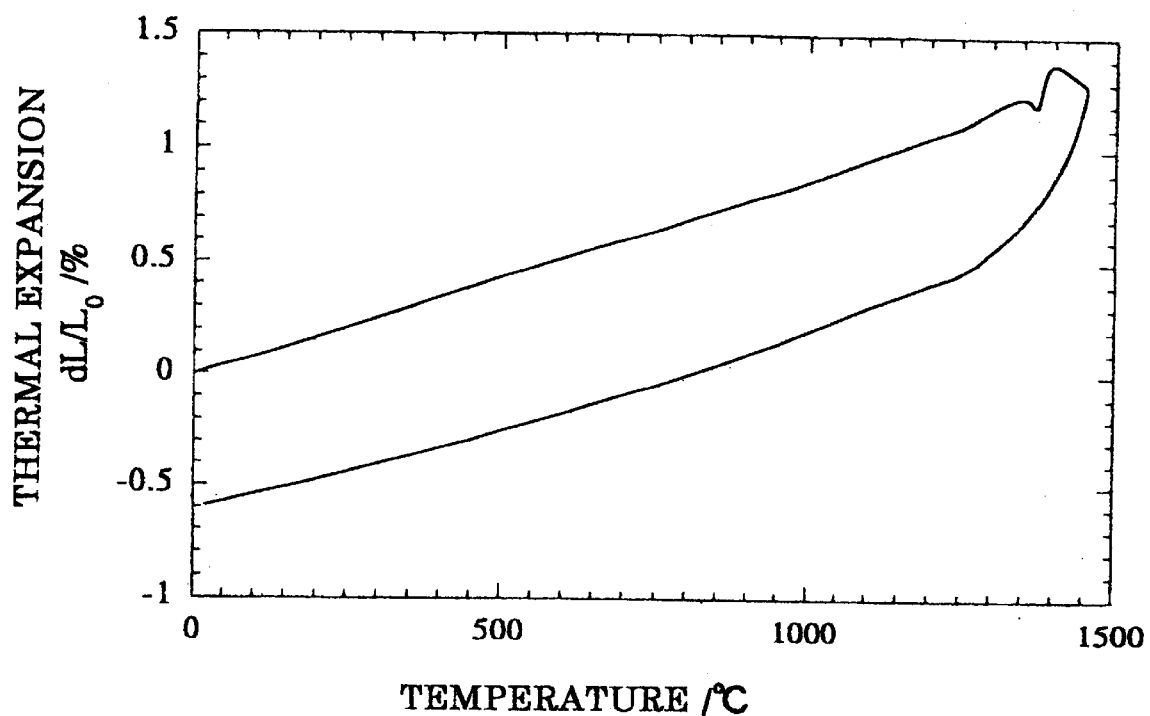
FIG. 3 is a graph of the thermal expansion curve of $Nd_{0.9}Si_{0.1}AlO_{3.05}$.
Figure 4:
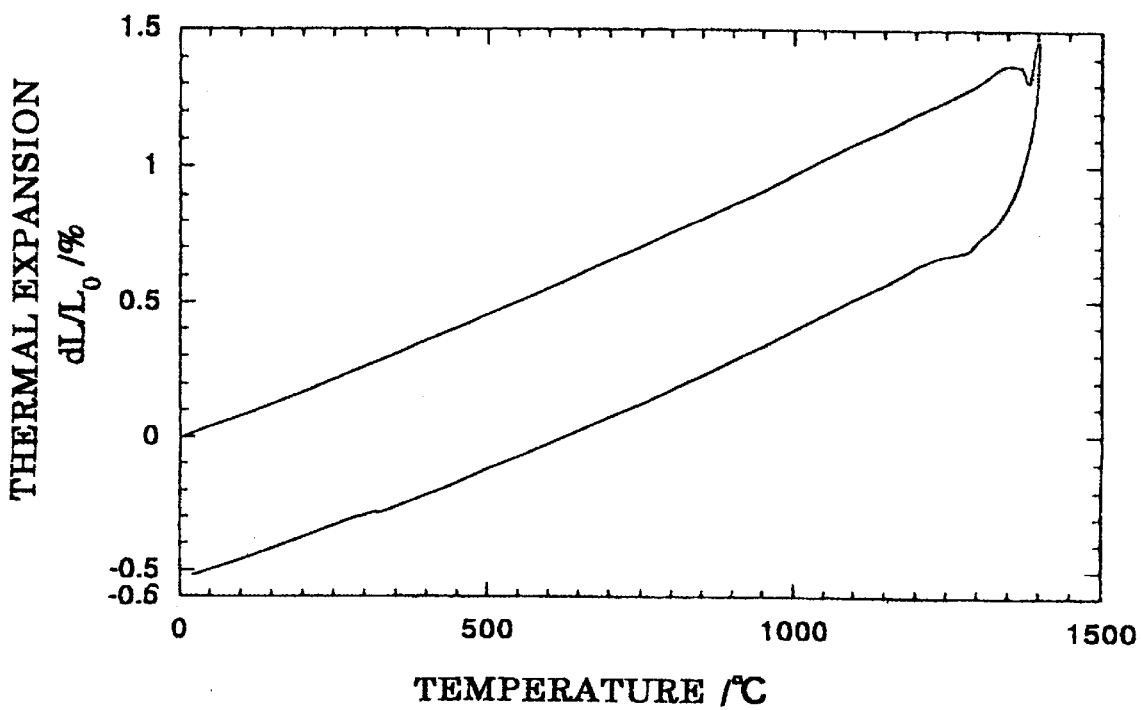
FIG. 4 is a graph of the thermal expansion curve of $Nd_{0.8}Si_{0.2}AlO_{3.1}$.

FIG. 3 and FIG. 4 show the thermal expansion curves of the substituted compounds, $Nd_{0.9}Si_{0.1}AlO_{3.05}$ (x=0.1) and $Nd_{0.8}Si_{0.2}AlO_{3.1}$ (x=0.2), respectively. The thermal expansion profile of those substituted compounds is nearly the same as that of the substituted compound shown in FIG. 2. From the above, it is known that substituting the Nd-site in $NdAlO_3$ compounds with Si brings about definite martensitic transformation of the substituted compounds.

In order that the compounds of $Ln_{1-x}Si_xAlO_{3+0.5x}$ ($SiO_2$-substituted compounds) of the invention could exhibit high toughness owing to their rubber-like elasticity, twin crystals must be formed in the martensite phase of the compounds at temperatures not higher than the transformation point of the compounds and the thus-formed twin crystals must move at their interfaces due to the stress to be caused by the propagation of the cracks formed in the compounds. This is because the crystal structure of $LnAlO_3$ has a hexagonal system, and therefore the compounds are anisotropic depending on the crystal orientation. In other words, since the compounds are poly-crystalline ones, they have some intergranular free spaces in which the twin crystals can move, resulting in that the compound could be highly tough.

In the compounds $Ln_{1-x}Si_xAlO_{3+0.5x}$ of the invention, which result from partially substituting the site $LnO_{1.5}$ with $SiO_2$, Ln indicates at least one rare earth element selected from Sc, Y, La, Ce, Pr, Nd, Pm, Sm, Eu, Gd, Tb, Dy, Ho, Er, Tm and Yb.

The $SiO_2$-substituted ceramic compounds of the invention, which are derived from $LnAlO_3$, have high toughness by themselves. In addition, even when they are compounded into composite materials (ceramics) in which they are in a matrix of any other compounds, for example, $Al_2O_3$, wollastonite ($CaSiO_3$, $CaO.SiO_2$), spodumene ($LiAlSi_2O_6$), C—$ZrO_2$, t-$ZrO_2$, spinel, mullite, glass, silica glass, hydroxyapatite, ABO3 complex oxide, germanate, phosphate, titanate, nitride, carbide, boride and silicate, especially those having a smaller thermal expansion coefficient than the compounds $Ln_{1-x}Si_xAlO_{3+0.5x}$, the composite materials still have high toughness like them. Specifically, the toughness of the composite materials comprising the $SiO_2$-substituted ceramic compounds of the invention is much higher than that of the single compounds mentioned above and even than that of their composite materials. In the $ABO_3$ complex oxide referred to above, "A" and "B" are sites at specific positions in a crystal lattice of a compound. "A" represents an element which exists in the "A" site of the crystal lattice, and "B" represents another element which exists in the "B" site of the crystal lattice.

In the composite materials comprising the $SiO_2$-substituted ceramic compounds of the invention, the $SiO_2$-substituted compound grains have a larger degree of shrinkage than the matrix grains of glass, wollastonite or the like. Therefore, in those, the twin crystals are easy to form. In addition, around the thus-formed twin crystals, formed is a space that facilitates the movement of the crystals therein. As a result of the space formation therein, the composite materials can absorb the energy from crack propagation owing to their rubber-like elasticity at temperatures not higher than their martensitic transformation point, and therefore have high toughness.

Now, methods for producing the ceramic compounds of the rational formula $Ln_{1-x}Si_xAlO_{3+0.5x}$ of the invention are mentioned below.

In one method, used are starting compounds of $Ln_2O_3$, $SiO_2$ and $Al_2O_3$. These starting compounds are weighed in any desired ratio to give the intended composition, and mixed. For the mixing, used is any of ball mills, rot mills, double-coating blenders, V-shaped mixers, etc.

Next, the resulting mixture is burned in a high-temperature furnace, in which the atmosphere is preferably an oxidizing one except for the case using $CeO_2$, in view of the economic advantages. However, even when burned in a non-oxidizing atmosphere, the mixture is formed into the intended compound of the invention.

However, where $CeO_2$ is used, the starting mixture comprising it must be burned in vacuum or in a reducing atmosphere comprising carbon or hydrogen. This is because, Ce exists only in the form of $Ce^{3+}$ in the compound $CeAlO_3$, and therefore $Ce^{4+}$ in $CeO_2$ must be reduced into $Ce^{3+}$.

The burning temperature in the furnace shall be 1200° C. or higher. This is because, if lower than 1200° C., the intended $SiO_2$-substituted compounds could not be produced efficiently. On the other hand, even though the $SiO_2$-substituted compounds melt at temperatures around 2000° C., the reaction to give the compounds still occur even at such temperatures. Therefore, the uppermost limit of the burning temperature is to be up to 2000° C. Preferably, the starting mixture is burned at a temperature falling between 1350 and 1600° C.

For burning it, the starting mixture is gradually heated in the furnace and then kept at an elevated temperature falling within the defined range for 0.1 to 3 hours, whereby the starting compounds are reacted with each other. The reason why the reaction time is defined to fall between 0.1 and 3 hours is because the reaction to give the substituted product is insufficient if the time is shorter than 0.1 hours. On the other hand, any longer reaction time over 3 hours is not needed, since the reaction to give the $SiO_2$-substituted product is finished within 3 hours. Preferably, the reaction time falling between 0.2 and 2 hours produces good results.

The heating rate shall fall between 1° C./min and 1000° C./min.

The high-temperature furnace to be used in the invention may be any one capable of generating high-temperature heat of not lower than 1000° C. For example, it includes ordinary furnaces equipped with a heating element of tungsten, molybdenum, platinum or graphite, oxidizing furnaces equipped with a heating element of molybdenum silicide, hot presses, hot isostatic presses, discharge plasma systems, etc.

Especially preferred are discharge plasma systems, in which the mixture to be burned can be heated rapidly and the time for which the mixture being burned is kept at high temperatures can be shortened. The present inventors' experiments have verified that the reaction of the starting mixture can be well finished within a residence time of from 0.01 to 0.5 hours in a discharge plasma. system.

EXAMPLE 1

(1) 327.03 g (1.9 mols) of $CeO_2$, 101.96 g (1 mol) of $Al_2O_3$ and 6.01 g (0.1 mols) of $SiO_2$ were put into a graphite crucible, heated up to 1600° C. in vacuum and kept at the temperature for 1 hour to obtain an SiO2-substituted compound, $Ce_{0.95}Si_{0.05}AlO_{3.025}$.

(2) 344.24 g (2 mols) of $CeO_2$ and 101.963 g (1 mol) of $Al_2O_3$ were burned under the same condition as above to obtain a compound, $CeAlO_3$.

These compounds were separately ground and sintered in vacuum at 1500° C., using a hot press, to obtain dense, sintered products. The properties of these two sintered products are shown in Table 1.

As in Table 1, the hardness, the bending strength and the toughness of the SiO2-substituted compound (1) are all larger than those of the non-substituted compound (2). In particular, the increase in the toughness of the compound (1) is significant. This is because of the effect of the rubber-like elasticity of the compound (1) resulting from its martensitic transformation.

TABLE 1

|  | Hardness (Hv) (GPa) | Bending Strength(MPa) | Toughness (MPa · m$^{1/2}$) |
|---|---|---|---|
| (1) $Ce_{0.95}Si_{0.05}AlO_{3.025}$ | 10 | 350 | 4.0 |
| (2) $CeAlO_3$ | 9.5 | 200 | 2.5 |

EXAMPLE 2

Four SiO$_2$-substituted compounds, $Nd_{1-x}Si_xAlO_{3+0.5x}$ of the invention, in which x=0.05, 0.10, 0.15 or 0.20, and one non-substituted compound, $NdAlO_3$ were produced from the starting compounds shown in Table 2. The starting compounds were mixed, and burned at the temperature shown in Table 2 for 1 hour. The products were separately ground into fine powders. Each powder was heated in a discharge plasma system up to a temperature falling between 1300 and 1400° C. over a period of about 10 minutes, and kept heated therein at the temperature at which the shrinking of the heated product stopped, for 5 minutes. Thus were obtained dense sintered products. The properties of those sintered products were measured, and the data obtained are shown in Table 2.

As in Table 2, the products having a larger degree of SiO$_2$ substitution have a smaller bulk density, but, on the contrary, have a larger hardness, a larger bending strength and a larger toughness. The reason why the toughness of the products increased is because of the effect of the rubber-like elasticity thereof resulting from their martensitic transformation.

EXAMPLE 3

The starting compounds for La—Ce—Gd—SiO$_2$—Al$_2$O$_3$ shown in Table 3 were formulated and mixed to have the rational formula mentioned below. The mixture was put into a graphite crucible, heated up to 1500° C. in vacuum over a period of 1.5 hours, and kept at the temperature for 1 hour to obtain a substituted compound (solid solution) of $(La_{0.6}, Ce_{0.2}, Gd_{0.2})_{0.9}Si_{0.1}AlO_{3.05}$. This was ground, heated in vacuum in a discharge plasma system up to 1400° C. over a period of 10 minutes, and kept at the temperature for 3 minutes to obtain a dense sintered product. Apart from this, a dense sintered product of $(La_{0.6}, Ce_{0.2}, Gd_{0.2})AlO_3$ was produced in the same manner as above.

The properties of those two sintered products were measured and shown in Table 3. As in Table 3, the bending strength and the toughness of the SiO$_2$-substituted product, $(La_{0.6}, Ce_{0.2}, Gd_{0.2})_{0.9}Si_{0.1}AlO_{3.05}$ are larger than those of the non-substituted. This indicates the significant effect of the rubber-like elasticity of the substituted product resulting from its martensitic transformation.

TABLE 3

|  | La$_2$O$_3$ (g) | CeO$_2$ (g) | Gd$_2$O$_3$ (g) | SiO$_2$ (g) | Al$_2$O$_3$ (g) | Hardness (GPa) | Bending Strength (MPa) | Toughness (MPa · m$^{1/2}$) |
|---|---|---|---|---|---|---|---|---|
| Substituted Product | 175.94 | 61.97 | 65.25 | 6.01 | 101.96 | 9.5 | 350 | 4.0 |
| Non-Substituted Product | 195.49 | 68.85 | 72.5 | 0 | 101.96 | 9.0 | 200 | 2.5 |

(1) 60 g of a powdery mixture comprised of 75% by weight of wollastonite (β-CaSiO$_3$) and 25% by weight of spodumene (β-LiAlSi$_2$O$_6$) was mixed with 40 g of Nd$_{0.9}$Si$_{0.1}$AlO$_{3.05}$, subjected to cold isostatic pressing (CIP), then heated up to 1100° C. in air over a period of 2 hours, and kept at 1100° C. for 2 hours to obtain a composite material. The composite material had a bending strength of 550 MPa and a toughness of 9 MPa·m$^{1/2}$.

Apart from this, the powdery mixture comprised of wollastonite and spodumene but not containing Nd$_{0.9}$Si$_{0.1}$AlO$_{3.05}$ was sintered and tested in the same manner as above. This had a bending strength of 200 MPa and a toughness of 2.2 MPa·m$^{1/2}$.

(2) On the other hand, the thermal expansion coefficient of the sintered product of the compound Nd$_{0.9}$Si$_{0.1}$AlO$_{3.05}$ was 9.5×10$^{-6}$/° C., while that of the sintered product of the powder mixture comprised of wollastonite and spodumene only was 4.7×10$^{-6}$/° C. and was small.

Accordingly, for the ceramic compound of the invention, it is believed that, since the thermal expansion coefficient of the matrix (wollastonite and spodumene) was smaller than

TABLE 2

| X | Al$_2$O$_3$ (g) | Nd$_2$O$_3$ (g) | SiO$_2$ (g) | Burning Temperature (° C.) | Bulk Density (g/cm$^3$) | Bending Strength (MPa) | Toughness (MPa · m$^{1/2}$) |
|---|---|---|---|---|---|---|---|
| 0 | 101.96 | 336.48 | 0 | 1600 | 6.72 | 150 | 2.7 |
| 0.05 | 101.96 | 319.66 | 6.01 | 1550 | 6.43 | 300 | 4.0 |
| 0.10 | 101.96 | 302.83 | 12.02 | 1500 | 6.23 | 350 | 4.0 |
| 0.15 | 101.96 | 286.01 | 18.03 | 1500 | 5.99 | 450 | 4.2 |
| 0.20 | 101.96 | 269.18 | 24.03 | 1450 | 5.74 | 400 | 4.5 | that of the dispersed grains (of the $SiO_2$-substituted compound), the toughness-increasing effect of the compound was much more augmented owing to its rubber-like elasticity, resulting in that the composite material having the composition that falls within the scope of the invention could have the increased strength and toughness.

EXAMPLE 5

75 g of mullite ($3Al_2O_3 \cdot 2SiO_2$, having a thermal expansion coefficient of $4.5 \times 10^{-6}/°C$.) was mixed with 25 g of $Nd_{0.8}Si_{0.2}AlO_{3.1}$, put into a graphite mold, heated up to 1300° C. in a discharge plasma system over a period of 9 minutes, and kept therein at the temperature for 3 minutes to obtain a dense composite material, of which the properties were measured. Mullite had a bending strength of 350 MPa and a toughness of $2.4$ $MPa \cdot m^{1/2}$, while the composite material produced herein had a larger bending strength of 600 MPa and a larger toughness of $7$ $MPa \cdot m^{1/2}$. In particular, the toughness of the composite material was much larger than that of mullite. This is because of the effect of the rubber-like elasticity of the compound, $Nd_{0.8}Si_{0.2}AlO_{3.1}$, that results from its martensitic transformation.

EXAMPLE 6

Herein produced were composite materials composed of a substituted compound, $Nd_{0.9}Si_{0.1}AlO_{3.05}$, and any of Pyrex glass, Code Numbers 7740 and 1723. Precisely, powder of the glass and powder of the substituted compound were mixed, put into a graphite mold, heated up to a predetermined temperature in vacuum in a discharge plasma system, kept therein at the temperature for 5 minutes to obtain the intended composite materials. The composition of the composite materials was comprised of 30% by volume of the substituted compound and 70% by volume of the glass.

The glass composition used in producing the composite materials, the temperature at which the composite materials were produced, and the bending strength and the toughness of the composite materials are shown in Table 4.

The bending strength of the glass used herein was 50 MPa and the toughness thereof was $1.1$ $MPa \cdot m^{1/2}$. As having such poor mechanical properties, the glass could not be used as a construction material. However, as in Table 4, the composite materials produced herein had much increased strength and toughness, and therefore could be used for construction.

TABLE 4

| No. | Pyrex Glass 7740 (vol. %) | Pyrex Glass 1723 (vol. %) | Production Temperature (° C.) | Bending Strength (MPa) | Toughness ($MPa \cdot m^{1/2}$) |
| --- | --- | --- | --- | --- | --- |
| 1 | 100 | 0 | 680 | 250 | 8.0 |
| 2 | 0 | 100 | 780 | 400 | 6.5 |
| 3 | 50 | 50 | 730 | 350 | 7.5 |

As has been described hereinabove, the present invention provides ceramic compounds which are stable even at temperatures not higher than room temperature and have high hardness, high strength and high toughness. In addition, the ceramic compounds of the invention can be combined with other various ceramics to give composite materials having increased toughness, and therefore, they greatly enlarge the use of ceramics. Moreover, the compounds of the invention are produced through substitution with $SiO_2$ to give $SiO_2$-substituted compounds. Therefore, the compounds are inexpensive, and the production method for them is easy. The industrial values of the ceramic compounds of the invention are high.

What is claimed is:

1. A method for producing a ceramic compound which undergoes martensitic transformation, comprising the steps of: disposing a starting mixture composed of 0.99 to 0.7 mols of $Ln_2O_3$, 0.02 to 0.6 mols of $SiO_2$ and 1 mol of $Al_2O_3$ into a graphite mold; and heating the starting mixture in vacuum or in an inert gas in a discharge plasma system to obtain a substituted product represented by compositional formula $Ln_{1-x}Si_xAlO_{3+0.5x}$, where x=0.01 to 0.3.

2. A method for producing a ceramic compound as claimed in claim 1; wherein the heating step comprises heating the starting mixture at a temperature in the range of 1200 to 1600° C.

3. A method of producing a ceramic compound as claimed in claim 2; wherein the heating step comprises heating the starting mixture for a time period in the range of 0.01 to 0.5 hours.

4. A composite material comprising: a ceramic compound comprising a compound represented by compositional formula $Ln_{1-x}Si_xAlO_{3+0.5x}$ obtained by substituting a part of $LnO_{1.5}$ in $LnAlO_3$-type compounds with $SiO_2$, where Ln represents at least one element selected from the group consisting of Sc, Y, La, Ce, Pr, Nd, Pm, Sm, Eu, Gd, Tb, Dy, Ho, Er, Tm and Yb, and x=0.01 to 0.3; and at least one compound selected from the group consisting of $Al_2O_3$, wollastonite, spodumene, spinel, mullite, glass, silica glass, hydroxyapatite, $ABO_3$ complex oxide, a germanate, a phosphate, a titanate, a nitride, a carbide, a boride and a silicate.

5. A composite material comprising: a compound represented by compositional formula $Ln_{1-x}Si_xAlO_{3+0.5x}$ where Ln represents at least one element selected from the group consisting of Sc, Y, La, Ce, Pr, Nd, Pm, Sm, Eu, Gd, Tb, Dy, Ho, Er, Tm and Yb, and x=0.01 to 0.3; and at least one compound selected from the group consisting of $Al_2O_3$, wollastonite, spodumene, spinel, mullite, glass, silica glass, hydroxyapatite, $ABO_3$ complex oxide, a germanate, a phosphate, a titanate, a nitride, a carbide, a boride and a silicate.

6. A ferrule comprising a composite material according to claim 5.

7. A method for producing a ceramic compound, comprising the step of: preparing a mixture of 0.99 to 0.7 mols of $Ln_2O_3$, 0.02 to 0.6 mols of $SiO_2$ and 1 mol of $Al_2O_3$; and sintering the mixture in a discharge plasma system to obtain a substituted product represented by compositional formula $Ln_{1-x}Si_xAlO_{3+0.5x}$ where x=0.01 to 0.3.

8. A method according to claim 7; wherein the sintering step comprises sintering the mixture at a temperature in the range of 1200 to 1600° C.

9. A method according to claim 8; wherein the sintering step comprises sintering the mixture for a time period in the range of 0.01 to 0.5 hours.

* * * * *